June 17, 1930. H. G. SLINING 1,764,758
LAWN SPRINKLER
Filed Dec. 21, 1928 2 Sheets-Sheet 1
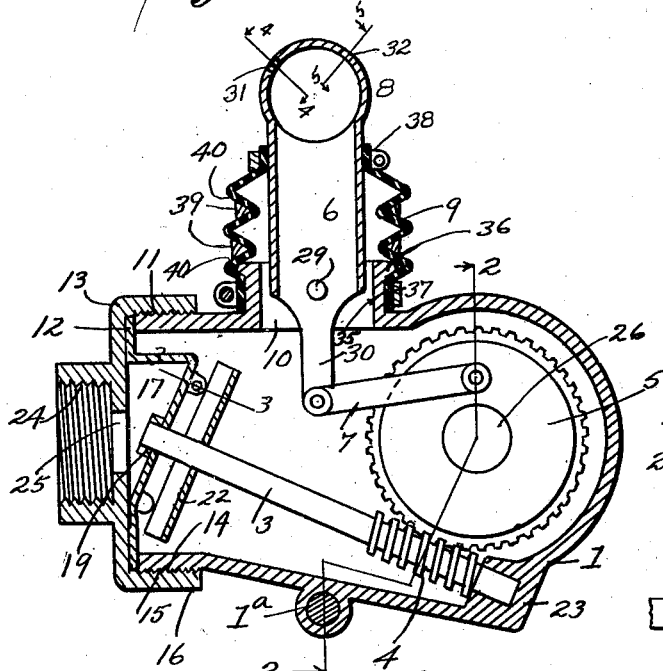
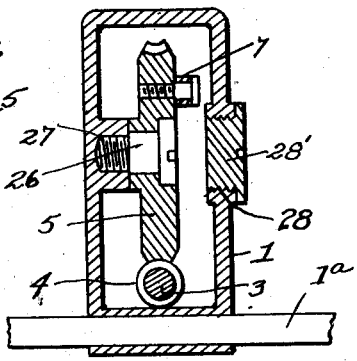
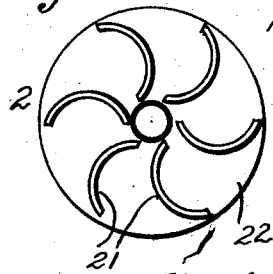
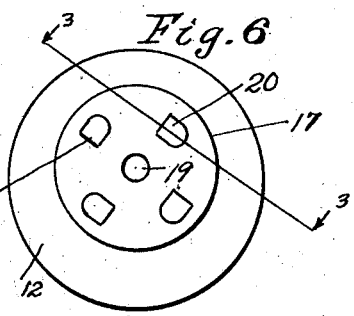
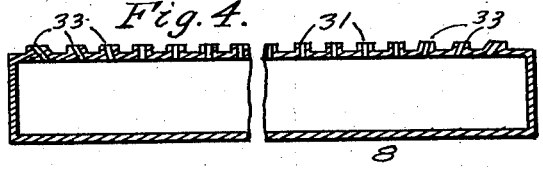
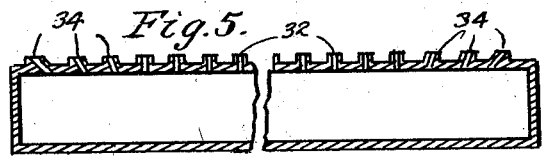
INVENTOR:
HENRY G. SLINING.
BY Alan Franklin
ATTORNEYS.

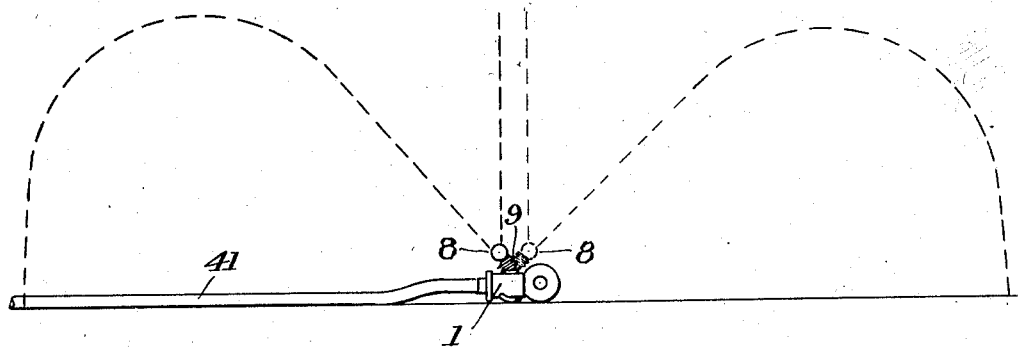
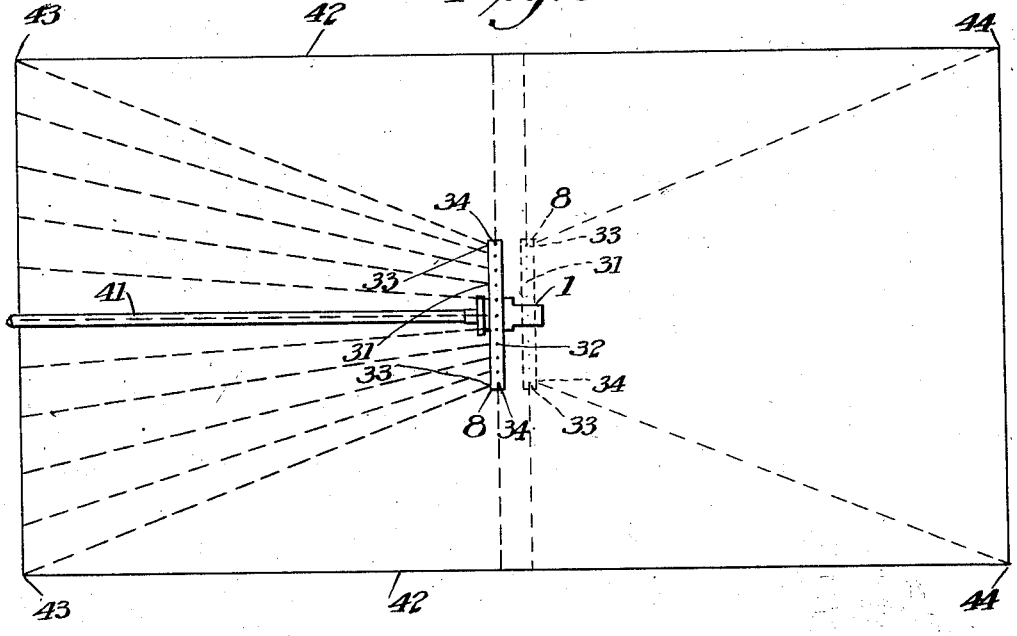

Patented June 17, 1930

1,764,758

UNITED STATES PATENT OFFICE

HENRY G. SLINING, OF WALNUT PARK, CALIFORNIA

LAWN SPRINKLER

Application filed December 21, 1928. Serial No. 327,705.

This invention relates to sprinklers, and more particularly to lawn sprinklers, and irrigation sprinklers.

The general object of the invention is to provide a simple, efficient and inexpensive lawn sprinkler which will completely sprinkle a lawn of predetermined area.

A more particular object is to provide a lawn sprinkler which will effectively sprinkle the corners of a lawn.

Another object is to provide an oscillative lawn sprinkler which may be operated by domestic low water pressure to sprinkle a lawn of relatively wide area.

A further object is to provide a lawn sprinkler with an oscillating nozzle constructed without packed joints.

Other objects and advantages will appear hereinafter.

The invention is illustrated in the annexed drawing which forms a part of this specification and in which, Fig. 1 is a longitudinal section of my lawn sprinkler.

Fig. 2 is a vertical section of the sprnikler taken on line 2—2 of Fig. 1.

Fig. 3 is a sectional view taken on line 3—3 of Fig. 1 illustrating the water power means.

Fig. 4 is a longitudinal section of the nozzle taken on line 4—4 of Fig. 1.

Fig. 5 is a longitudinal section of the nozzle taken on line 5—5 of Fig. 1.

Fig. 6 is a front view of the water pocket disc.

Fig. 7 is a front view of the water wheel.

Fig. 8 is a side view of the sprinkler with its nozzle swung to the left in the act of sprinkling the left half of a lawn.

Fig. 9 is a plan view of Fig. 8.

Corresponding parts are designated by the same reference characters in all the figures.

My sprinkler includes a casing 1, a water wheel 2, a water wheel shaft 3, a worm 4 on said shaft, a worm gear 5 in mesh with said worm, an outlet pipe 6, a link 7 connecting said worm wheel and the inner end of said outlet pipe, a nozzle 8 connected to the outer end of said outlet pipe, and a flexible sleeve 9 surrounding said outlet pipe outside the casing 1 and connected at one end to said casing over an outlet 10 in the upper wall of said casing and connected at its other end to said outlet pipe. A base member 1ª is secured in the lower part of the casing 1 which member rests upon the lawn and supports the casing in an upright position.

One end of the casing 1 is provided with an opening 11 which is closed by a disc 12 which fits over said opening and said end of the casing and is detachably held in position on said end by a cap 13, said cap being screw seated on said end of the casing by means of interengaging threads 14 and 15 respectively on said end of the casing and in the flange 16 of said cap. The disc 12 is formed in its outer side with a water pocket 17, the inner wall 18 of which extends upwardly and inwardly at an angle and is provided with a central bearing 19 in which the upper end of the shaft 3 is journaled, and with a plurality of outlet ports 20 spaced around said bearing for admitting water from said pocket to the blades 21 of the water wheel 2. The ports 20 extend at an angle to the rear pocket wall 18 so that the water passing therethrough will impinge directly upon the blades 21 of the water wheel 2 to rotate the said wheel together with the shaft 3 and worm 4, the water wheel being constructed with a disc 22 which is secured against the rear edges of the blades 21, thus confining the water in the wheel between said disc and the pocket wall 18, so that the water must travel outwardly over the blades over the outer ends thereof to escape from the wheel, whereby the maximum power of the water is utilized to rotate the wheel. The inner and lower end of the shaft 3 is journaled in a bearing 23 in the inner end of the casing 1 below the worm wheel 5. The cap 13 is formed with a threaded hose connection 24 and with an inlet port 25 leading from said hose connection into the water pocket 17.

The worm wheel 5 is secured on a shaft 26 journaled in bearings 27 and 28 in the casing 1, the bearing 28 being screw seated in one side wall of the casing 1 so that it may be removed to place the worm wheel 5 within in or to remove said wheel from the casing.

The outlet pipe 6 extends out through the outlet 10 and is pivoted to the casing 1 in said outlet on a pivot 29. The outlet pipe 6 is formed with a depending arm 30 to which is connected one end of link 7, the other end of said link being connected to the worm gear 5.

The nozzle 8 may be a straight perforated pipe connected intermediate its ends to the outer end of the outlet pipe 6, and extending horizontally. The nozzle is provided in its upper wall with two longitudinal rows of perforations 31 and 32, the perforations 31 extending outwardly at an angle toward one side and the perforations 32 extending outwardly at an angle toward the other side of the nozzle. One or more perforations 33 and 34 at each end of the nozzle 8 are inclined toward said ends so as to spray the water a maximum distance beyond said ends of the nozzle, as well as to the sides thereof.

The outlet 10 is formed by a nipple 35, outstanding from the casing 1, and an external flange 36 is formed on the outer end of said nipple 35, over which flange and nipple extends the lower end of the flexible sleeve 9, which end of said sleeve is clamped on said nipple under said flange by a clamp 37. The outer end of the sleeve 9 is clamped to the outer end of the outlet pipe 6 by means of a clamp 38. The sleeve 9 may be of bellows formation with rigid metal rings 39 surrounding the same and fitted closely in the crotches of the annular grooves 40 of such bellows formation, whereby the flexible sleeve is prevented from expanding under the pressure of the water entering the same, and is given greater flexibility than otherwise so as to yield readily to the oscillation of the outlet pipe 6 under the influence of low domestic water pressure.

The operation of my invention is as follows:

The outer end of a domestic hose 41 is connected to the hose connection 24. The water passing through the hose passes through inlet 25 into pocket 17 from which it passes through ports 20 into the water wheel 2, impinging directly upon the wheel blades 21 and rotating said wheel, shaft 3 and worm 4. The worm 4 rotates the worm gear 5 and said gear, through link 7 and arm 30 oscillates the outlet pipe 6 and the nozzle 8, the flexible sleeve 9 yielding to permit such oscillation. The water passing over the outer ends of the blades 21 of the water wheel fills the interior of the casing 1, the outlet 10 and the sleeve 9 and passes through said outlet out through the outlet pipe 6 into the nozzle 8 and out of the nozzle through the perforations 31, 32, 33 and 34.

As the nozzle 8 is swung to the left the left half of the lawn is sprinkled by the water passing through the perforations 31 and 33, the water passing through the perforations 33 sprinkling the left half of the lawn beyond the ends of the nozzle along the lines 42 and sprinkling the left corners 43 of the lawn. As the nozzle is swung to the right, the right half of the lawn is sprinkled by the water passing through the perforations 32 and 34, the water passing through perforations 34 sprinkling the right half of the lawn beyond the ends of the nozzle along the lines 42 and sprinkling the right corners 44 of the lawn. It will thus be seen that my sprinkler will sprinkle entirely a lawn of predetermined area.

Having described my invention I claim:

1. A lawn sprinkler comprising a casing provided with an inlet and an outlet, a water wheel rotated by water passing through said inlet, an outlet pipe pivoted in said outlet, a nozzle on the outer end of said outlet pipe, means actuated by said water wheel for oscillating said outlet pipe and nozzle, and a flexible sleeve surrounding said outlet pipe clamped at one end to the casing over said outlet and clamped at its other end to the outer end of said outlet pipe.

2. A lawn sprinkler comprising a casing provided with an inlet and an outlet, a water wheel rotated by water passing through said inlet, an outlet pipe pivoted in said outlet, a nozzle on the outer end of said outlet pipe, means actuated by said water wheel for oscillating said outlet pipe and nozzle, and a flexible sleeve of bellows formation surrounding said outlet pipe clamped at one end to the casing over said outlet and clamped at its other end to the outer end of said outlet pipe.

3. A lawn sprinkler comprising a casing provided with an inlet and an outlet, a water wheel rotated by water passing through said inlet, an outlet pipe pivoted in said outlet, a nozzle on the outer end of said outlet pipe, means actuated by said water wheel for oscillating said outlet pipe and nozzle, and a flexible sleeve of bellows formation surrounding said outlet pipe clamped at one end to the casing over said outlet and clamped at its other end to the outer end of said outlet pipe and rigid rings surrounding said sleeve and fitted closely in the annular grooves thereof to prevent bulging of the sleeve.

4. In a lawn sprinkler, a casing open at one end and provided with an outlet, a disk formed with a water pocket and fitted over said open end of the casing, a cap screw-seated on said open end of the casing against said disk and holding said disc in position on said open end of the casing, said cap being provided with a water inlet in communication with said pocket, a water wheel adjacent said pocket, the pocket wall adjacent said water wheel being provided with a plurality of ports through which water passes from said pocket into the water wheel for rotating the same, a nozzle in communication with said outlet, and means actuated by said water wheel for oscillating said nozzle.

HENRY G. SLINING.